United States Patent [19]

Kansupada et al.

[11] Patent Number: 5,073,419
[45] Date of Patent: Dec. 17, 1991

[54] FILM COMPOSITE AND PACKAGED TIRE THEREWITH

[75] Inventors: Bharat K. Kansupada, Mogodore; Martin A. Phillips, Jr., Stow; Ottavio J. Mallamaci, North Canton, all of Ohio

[73] Assignee: The Goodyear Tire & Rubber Company, Akron, Ohio

[21] Appl. No.: 320,348

[22] Filed: Mar. 8, 1989

[51] Int. Cl.$^5$ .............................................. B29D 22/00
[52] U.S. Cl. .................... 428/35.4; 428/34.9; 428/216
[58] Field of Search ................ 428/35.4, 34.9, 216

[56] References Cited

U.S. PATENT DOCUMENTS 4,416,791  11/1983  Haq ................................ 428/35.4

*Primary Examiner*—Edith L. Buffalow
*Attorney, Agent, or Firm*—Henry C. Young, Jr.

[57] ABSTRACT

A film composite comprised of a linear low density polyethylene film having a polyvinylalcohol coat thereon. A package is provided comprised of a toroidally shaped pneumatic rubber tire having such film composite stretched wrapped around its toris in a helical fashion with the polyvinylalcohol coating positioned against the surface of the tire.

10 Claims, No Drawings

FILM COMPOSITE AND PACKAGED TIRE THEREWITH

FIELD

This invention relates to a film composite for application to tires. The invention further relates to a package comprised of a tire wrapped with said film composite.

BACKGROUND

Pneumatic rubber tires are often manufactured with sidewall or sidewall identifying profile having a contrasting color to the remainder of the tire. Pneumatic rubber tires are typically black in color due to the carbon black particulate reinforcement mixed with the rubber itself. Often such tires are manufactured with a distinctively colored, often white, sidewall on at least one side of the tire and, sometimes with a distinctively colored label, raised letters or numbers or other identification. The white or other contrastingly colored rubber is prepared without carbon black and usually contains a coloring pigment such as, for example, titanium dioxide or other pigment imparting a white or other contrasting color.

Such tires, after they are manufactured, are typically shipped to a designated location where they may then be stored for a period of time. The tires are often stacked one on top of the other or side-by-side against each other, white sidewall to black sidewall, (sometimes referred to as "ricked"), for such shipping and for storage purposes.

It has been observed that the white sidewall of such stacked pneumatic tires can become discolored or stained, primarily due to migration of amine based antidegradants and/or aromatic rubber processing oils contained in the black rubber of the adjacent pneumatic tire. The visual discoloration or staining of the white sidewall normally becomes evident after exposure of such white sidewall rubber containing the migrated staining type materials to ultraviolet light such as sunlight. Such contact staining phenomenon is well known to those having skill in such art.

Often, the surfaces of white sidewall portions of tires are coated with a material or composition to inhibit such chemical migration from one tire to the other and thus, retard or prevent the aforesaid visual staining effect. Polyvinylalcohol (PVA), particularly in a plasticized form, is often used for such purpose because it can be relatively easily applied as a water based solution, provides a reasonable barrier to the representative chemical migration and, because of its water solubility, can later be relatively easily removed by washing from the tire surface when desired. The PVA coat is designed as a relatively temporary coating for tire shipping or storage purposes which is later washed off by the user. However, such PVA coating, partly because of its relatively low abrasion resistance, can be scuffed during shipping and storage conditions and, thus, leaving portions of the white sidewall unprotected and subject to the aforesaid staining effect. Such use of polyvinylalcohol is well known to those having skill in such art.

Tires are also sometimes wrapped with a suitable protective wrapping material for such purpose such as, for example, paper (cellulosic materials), vinylchloride/vinylacetate copolymer and polyester films. However, such wrapping materials, unless they contain an adhesive backing, often become loose around the wrapped tire, thus, presenting an unattractive appearance and sometimes can cause a part of the tire surface to become exposed and, thus, subject to the aforesaid contact staining. Wrappings with an adhesive backing can also become difficult to easily remove from the tire. Sometimes such adhesive backed wrapping was in pieces upon removal. On occasion, it has been observed that stacks of such wrapped tires had become relatively unstable, allowing some tires to tend to slip and fall from the stack.

Therefore, it remains to be desired to provide protective coverings for white sidewall tires to inhibit their visual discoloration caused by contact with black sidewall tires particularly under conditions of storage and shipping and, also, for aesthetic and handling purposes.

DISCLOSURE AND PRACTICE OF THE INVENTION

In accordance with this invention, it has been discovered that a useful film composite is comprised of a linear low density polyethylene film substrate (LLDPE) having adhered thereto a coating of polyvinylalcohol (PVA) wherein said linear low density polyethylene film has a recovery from deformation in the range of about 20 to about 40 percent according to ASTM Test No. D822 when having a thickness of about 2.5 mils.

It is preferred that the linear low density polyethylene film further has the physical properties of, when having a thickness of about 2.5 mils, an elongation of at least about 40 percent, a resistance to tear in the range of about 350 to about 450 grams according to ASTM Test No. D1922; and a melt index in the range of about 1 to about 4 according to ASTM Test No. 1238.

In practice, it is preferred that the linear low density polyethylene (LLDPE) film has a thickness in the range of about 0.2 to about 3 mils and the polyvinylalcohol (PVA) coating has a thickness of about 0.1 to about 3, preferably about 0.2 to about 2.5 mils.

The PVA itself typically is about 80% to about 99.5%, preferably about 83% to about 95%, hydrolyzed, and typically has a viscosity at 23° C. in the range of about 3 to about 9 centipoise for a 4% aqueous solution of the PVA itself. Those having skill in such art recognize such characterization and that it is typically obtained by the hydrolysis of polyvinylacetate. Therefore, the PVA typically contains a residual amount of polyvinylacetate (PVAC) to the extent that it has not been fully hydrolyzed. For the purposes of the description of this invention, the terms polyvinylalcohol and PVA are intended to describe and encompass such material containing a small amount of PVAC. Such PVA and description thereof are well known to those having skill in such art.

The PVA coating conventionally contains, for the said composite, plasticizer, a wetting agent, defoaming agent and fungicide and other minor additives as is well known.

Typically the PVA coating is comprised of 100 parts by weight PVA and about 10 to about 20 or, in some cases, up to about 30 weight percent plasticizer as a viscosity controlling component for the purpose of ease of processing and application to the polyethylene film as well as for enhancing its flexibility and its film forming ability at room temperature. Suitable plasticizers may be, for example, glycerin, polyglycerols and optionally polyalkyleneetherglycols, preferably polyethyleneetherglycol, (polymerized glycols). Such coating compositions are relatively well known in such art.

In the practice of this invention, the film composite can be conveniently prepared by the steps of: (A) solution casting the PVA onto the LLDPE film substrate such as, for example, by coating the LLDPE film with the PVA coating as a 10–40 weight percent water/alcohol solution thereof and drying the coat thereon or (B) by coextruding the LLDPE and PVA coating to form the film laminate composite thereof, typically composed of alternate layer(s) of PVA coated LLDPE film.

The linear low density polyethylene is used in order to provide the composite with the desired stretch (elongation) and recovery and tear properties Indeed the use of a linear low density polyethylene enables the preparation of the composite film of this invention which can be "stretch wrapped" onto the tire to form a package thereof.

The density of the polyethylene itself is provided by the nature of the linear low density polyethylene resin polymerization and manufacturing process and monomer control. Although not considered a criticality to this invention, a typical range of density is, for example, about 0.914 to 0.932.

The linear low density polyethylene is actually a copolymer of ethylene and a very small amount (up to about 10 or even about 15 weight percent, for example, although the precise amount may not necessarily a criticality to this invention) olefinic monomers, particularly alpha olefinic monomers typically, although not necessarily limited to those containing 4–8 carbon atoms. A representative example of such olefinic monomer are alpha olefinic butene, hexene and/or octene. The amount and selection of such comonomer is utilized by the manufacturer as well as polymerization catalyst and conditions in order to obtain the hereinbefore pointed out physical properties for the LLDPE and enable it to be substantially linear in nature. Such practice is well known to those having skill in such art.

In further accordance with this invention, a package is provided comprised of a toroidally shaped rubber tire, preferably a pneumatic rubber tire having its toris stretch wrapped in a helical fashion with the film composite of this invention where said polyvinylalcohol coating is adjacent to and contacting the outer surface of said tire.

In one aspect, at least a portion of a sidewall of a black colored pneumatic tire has a color lighter than (e.g. white) and contrasting to the remainder of the tire.

In the practice of this invention, the tire is wrapped with the film composite under tension so that the film is stretched (elongated under tension) while being applied to the tire and after being applied to the tire allowed to relax, recover and substantially conform to the tire surface configuration.

Thus, the low abrasion resistance of the PVA coating is protected by and positioned directly against the tire by the stretch wrapped coated LLDPE film.

An important and significant aspect of this invention resides in the ability of the film composite to position the polyvinyl alcohol barrier layer, or coating, tightly against the surface of the said contrasting colored rubber where it can be effectively combined with the ability of the film composite to substantially conform to the shape of and lightly adhere to the outer surface of the tire.

The ability of the film composite, particularly such composite based on a linear low density polyethylene, to conform somewhat to the shape of the tire and lightly adhere to it is due, in part, to its stretchability and recovery property. Thus, it is typically desired to apply the film composite under tension and thus in a slightly stretched condition.

This method of applying the film composite is conveniently termed "stretch" wrapping, a method well known in the film application art although the actual extent of stretching of the film composite may be relatively small as compared to some other films for stretch wrapping purposes.

Thus, it is an important aspect of this invention that it relies on the recovery property of the composite film of this film after being stretched, or elongated under tension.

As another important aspect, the PVA coated LLDPE film has a relatively high clarity and, thus, enables a rather high visibility of the wrapped tire: thus, presenting a significant aesthetic and practical value.

The invention is exemplified by the following Examples where the parts and percentages are by weight unless otherwise noted.

EXAMPLE I

A black pneumatic rubber tire designated as 195/R14 was obtained which had a white sidewall, namely, in which one of its sidewalls had an axially circular white rubber inlay therein. The white colored rubber did not contain staining antidegradants or aromatic processing oil therein.

A film composite was prepared by coating a linear low density polyethylene film having a thickness of about 3.0 mils and a density of about 0.916, with a solution of polyvinylalcohol following which the coating was dried at about 50° C. for about 3 minutes.

The linear low density polyethylene can be described as a copolymer of ethylene and a small amount of at least one olefin, particularly an alpha olefin such as hexene or octene with a recovery value of about 20–40% according to ASTM D822, obtained as Escorene LL3001 from Exxon Chemical Company and Dowlex 2044 from Dow Chemical Company, respectively.

The polyvinylalcohol (PVA) coating solution contained about 23 weight percent of the PVA coating composition in a water solvent therefor. The PVA coating was prepared by adding water to a concentrate obtained from the Spraylat Company as a water based solution (40% solids) containing the PVA coating composition as about 80 parts PVA, about 20 parts polyglycerol type plasticizer and about 1 percent additives such as defoamer, fungicide, etc. The PVA can generally be described as a partially to super hydrolyzed resin with a maximum of 5 weight percent volatiles.

Generally, the resulting PVA is in about an 80 to about 99.3, preferably about 82 to about 92, percent hydrolyzed form. A general purpose of using the hydrolyzed form is to improve its solubility in water.

Black pneumatic rubber tires containing one white rubber sidewall were subjected to an evaluation as follows.

One group of rubber tires was stacked vertically face to face (white sidewall to black sidewall) about 20 tires high during shipment (Group A).

Similar tires were stacked about 20 tires high during shipment (white sidewall to black sidewall) (Group B) with the film composite of this invention having been spirally stretch wrapped in a helical fashion around each tire to cover its white sidewall with the PVA coated portion of the coated LLDPE film adjacent and next to the white sidewall of the wrapped tire. The period of shipment was about 3 days.

The stacks of tires were stored, after shipment, for about 7 days in vertical stacks of about 7-8 tires high during storage at a temperature of about 40°-70° C. after which the tires were removed therefrom, exposed to sunlight for about 8-16 hours during a 24-48 hour storage period, and observed. The observed results are shown in the following Table 1.

TABLE I

| Tires | Reflective Light Rating[1] | White Sidewall Appearance |
|---|---|---|
| Stacked without film composite | 19-40 | Stained (medium to dark brown) appearance |
| Stacked with film composite | 64 | No visible staining effect |
| White sidewall CONTROL tire | 64 | No visible stain (because no contact with other tires) |

[1] A higher reflective light rating value indicates less visual stain or discoloration of the white sidewall which is more desirable. A maximum value of the rating was in the range of 64-66 for the white sidewall material in this test. The test is conducted by placing a light sensitive meter against the white sidewall and observing the reflecting light. A higher observed value indicates a higher degree of whiteness.

The PVA coated LLDPE film exhibited a relatively high clarity (a haze value of less than 2.5% according to ASTM D1003) and, thus, enabled a high visibility of the stretch wrapped tire.

As an important aspect of this invention, it was observed that the wrapped (packaged) tires could be stacked vertically without a tendency for them to slip and fall from the stack.

EXAMPLE II

In the laboratory, flat samples of cured black compounded rubber (B) and flat samples of cured white compounded rubber (W) were prepared.

One of the white compounded rubber samples (W) was wrapped with a film composite of the type described in Example I.

Two sample assemblies were prepared. One assembly (A) was composed of the cured black compounded rubber sample placed over and against the cured white compounded rubber sample.

A second sample assembly (B) was composed of a cured black compounded rubber sample placed over and against a cured white compounded rubber sample (w) which had been wrapped with the said film composite.

About a one pound weight was placed on the upper black rubber sample of each sample assembly.

Both weighted assemblies were placed in a hot air oven at 70° C. for about 24 hours. The assemblies were then removed from the oven and disassembled.

The white rubber samples were then placed under an ultraviolet light for about 2 hours and then removed therefrom.

A reflective light meter was then placed against the surface of the white rubber samples and the value of light reflection was observed as shown in the following Table 2.

TABLE 2

| Sample | Visual Color Appearance | Reflective Light Rating |
|---|---|---|
| 1. White rubber, (CONTROL) untreated | White | 62-66 |
| 2. White rubber, (without film wrapping) (Assembly A) | Dark Brown | 15-30 |
| 3. White rubber, aged (with film composite wrap) (Assembly B) | White to very light Yellow | 58-64 |

EXAMPLE III

A film composite is prepared similarly to Example I except that it is prepared by coextruding the PVA coating material and LLDPE instead solution casting the PVA. Thus, the PVA coating material is not applied as a water/alcohol solution thereof.

Laboratory samples are prepared and tested as in Example II with similar results.

For the purpose of this example, the PVA coating composition can be obtained as Vinex 1003 from Air Products Inc.

What is claimed is:

1. A package comprised of a toroidally shaped pneumatic rubber tire having a film composite of a low density polyethylene (LLDPE) film substrate with a polyvinylalcohol coating thereon, spirally stretch wrapped around its toris in a helical fashion with the polyvinylalcohol coating thereof positioned against the surface of said tire; wherein said LLDPE has a recovery value in a range of about 20 to about 40 percent according to ASTM D822 and where said polyvinylalcohol coating is comprised of 100 parts by weight polyvinylalcohol and about 10 to about 30 parts by weight plasticizer therefor.

2. The package of claim 1 where LLDPE film has a thickness in a range of about 0.2 to about 3 mils and said polyvinylalcohol coating has a thickness in a range of about 0.1 to about 3 mils.

3. The package of claim 1 wherein said LLDPE film is a copolymer derived from 100 parts by weight ethylene and up to about 15 parts by weight of at least one alpha olefin hydrocarbon monomer having from 4 to 8 carbon atoms.

4. The package of claim 1 where said LLDPE film is a copolymer of 100 parts by weight ethylene and up to about 15 parts by weight of at least one of butene, hexene and octene.

5. The package of claim 1 where the said plasticizer for the said polyvinylalcohol coating comprises at least one of glycerin and polyglycerol.

6. The package of claim 4 where said plasticizer for the said polyvinylalcohol comprises at least one of glycerin and polyglycerol.

7. The package of claim 1 where said LLDPE film is a copolymer derived from 100 parts by weight ethylene and p to about 10 parts by weight of at least one alpha olefin hydrocarbon having 4 to 8 carbon atoms and where said polyvinylalcohol coating is comprised of 100 parts by weight polyvinylalcohol and about 10 to about 30 parts by weight weight plasticizer therefor comprised of at least one for glycerin and polyglycerol.

8. The package of claim 7 where said LLDPE film is a copolymer of 100 parts by weight ethylene and about 10 to about 30 parts by weight of at least one of butene, hexene and octene.

9. The package of claim 1 where the said pneumatic rubber tire is black colored and at least a portion of a rubber sidewall thereof has a white color.

10. The package of claim 8 where the said pneumatic rubber tire is of a black colored rubber which contains at least one amine based antidegradant and/or aromatic processing oil and at least a portion of a rubber sidewall thereof has a white color.

* * * * *